US012362526B2

(12) United States Patent
Chen

(10) Patent No.: US 12,362,526 B2
(45) Date of Patent: Jul. 15, 2025

(54) ELECTRICAL CONNECTOR

(71) Applicant: Delta Electronics, Inc., Taoyuan (TW)

(72) Inventor: Heng-Chao Chen, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 392 days.

(21) Appl. No.: 18/086,466

(22) Filed: Dec. 21, 2022

(65) Prior Publication Data

US 2024/0128696 A1 Apr. 18, 2024

(30) Foreign Application Priority Data

Oct. 12, 2022 (CN) ......................... 202211248605.3

(51) Int. Cl.
*H01R 24/60* (2011.01)
*H01R 13/53* (2006.01)
*H01R 13/652* (2006.01)
*H01R 107/00* (2006.01)

(52) U.S. Cl.
CPC ............ *H01R 24/60* (2013.01); *H01R 13/53* (2013.01); *H01R 13/652* (2013.01); *H01R 2107/00* (2013.01)

(58) Field of Classification Search
CPC .. H01R 13/53; H01R 13/652; H01R 13/6471; H01R 24/60; H01R 2107/00
See application file for complete search history.

(56) References Cited

U.S. PATENT DOCUMENTS 9,601,883 B1 3/2017 Chung et al.
9,990,320 B2 6/2018 Cheng et al.
10,062,992 B2 8/2018 Zhao
10,084,254 B2 9/2018 Ge
10,305,229 B2 * 5/2019 Zhao .................... H01R 13/504
2016/0322753 A1 * 11/2016 Cheng .................. H01R 13/631

FOREIGN PATENT DOCUMENTS

CN 109149186 A 1/2019
CN 214754257 U 11/2021
CN 216624626 U 5/2022
KR 102229847 B1 3/2021
TW 201711298 A 3/2017
TW 201828542 A 8/2018
WO 2020076040 A1 4/2020

* cited by examiner

*Primary Examiner* — Oscar C Jimenez
(74) *Attorney, Agent, or Firm* — KIRTON McCONKIE; Evan R. Witt

(57) ABSTRACT

An electrical connector includes a housing having a front end and a rear end, an insulator including a tongue portion disposed at the front end and a base disposed at the rear end, and plural terminals including plural ground terminals, plural power terminals and plural signal terminals. Each of the plural terminals has a first contact portion, a second contact portion and a connection portion connecting the first contact portion with the second contact portion. The first contact portions are disposed on surfaces of the tongue portion in a widthwise direction perpendicular to a direction from the front end to the rear end, and the second contact portions are extended out from the base. Widths in the widthwise direction of the second contact portions of the plural ground terminals and the plural power terminals are larger than a width of the first contact portion respectively thereof.

9 Claims, 6 Drawing Sheets

ELECTRICAL CONNECTOR

CROSS-REFERENCE TO RELATED APPLICATION

This application claims priority to China Patent Application No. 202211248605.3 filed on Oct. 12, 2022. The entire contents of the above-mentioned patent application are incorporated herein by reference.

FIELD OF THE INVENTION

The present disclosure relates to an electrical connector, and more particularly to an electrical connector capable of carrying a high level of current.

BACKGROUND OF THE INVENTION

USB connectors, especially USB Type-C connectors, have become one of the main interfaces for data transmission and power charging.

USB Type-C connectors include an upper row and a lower row of terminals which have identical arrangements. Each row of terminals includes signal terminals, ground terminals and power terminals, in which the ground terminals and the power terminals are related to the charging process.

Recently, the demanding for rapid charging becomes higher and higher. However, when charging through the conventional connector, due to the limitations caused from the specifications of the ground terminals and the power terminals thereof, the rated current cannot be increased, so the conventional electrical connector has difficulty in carrying a high level current and achieving the rapid charging. Further, the temperatures of the conventional terminals during charging also might be increased easily.

Therefore, there is a need of providing a novel electrical connector in order to solve the above drawbacks.

SUMMARY OF THE INVENTION

An object of the present disclosure is to provide an electrical connector in order to overcome at least one of the above-mentioned drawbacks.

Another object of the present disclosure is to provide an electrical connector which can achieve efficiencies of improving heat dissipation, reducing temperature rising and increasing the rated current through widening widths of the ground terminals and the power terminals to carry a high level of current.

A further object of the present disclosure is to provide an electrical connector which varies the dimension and the shape at the circuit board connecting end thereof for accommodating the widened ground terminals and the widened power terminals, so that the intervals among the terminals can be maintained, and also the structure of the plugging end of the electrical connector can remain unchanged.

In accordance with an aspect of the present invention, an electrical connector is provided. The electrical connector includes a housing, an insulator and a plurality of terminals. The housing has a front end and a rear end, wherein a direction parallel to a direction from the front end to the rear end is a lengthwise direction of the housing, and a direction perpendicular to the lengthwise direction is a widthwise direction of the housing. The insulator is accommodated in the housing and includes a tongue portion disposed at the front end and a base disposed at the rear end. The plurality of terminals are accommodated in the housing and include a plurality of ground terminals, a plurality of power terminals and a plurality of signal terminals, wherein each of the plurality of terminals has a first contact portion, a second contact portion and a connection portion connecting the first contact portion with the second contact portion. The first contact portions of the plurality of terminals are disposed on surfaces of the tongue portion and arranged in the widthwise direction, and the second contact portions of the plurality of terminals are extended out from the base. A width in the widthwise direction of the second contact portion of each of the plurality of ground terminals and a width in the widthwise direction of the second contact portion of each of the plurality of power terminals are larger than a width in the widthwise direction of the first contact portion respectively thereof. The housing in the lengthwise direction is divided into a first section located at the front end and a second section located at the rear end, and a width of the second section in the widthwise direction is larger than a width of the first section in the widthwise direction.

In an embodiment, the second contact portions of the plurality of ground terminals and the plurality of power terminals are arranged in the widthwise direction at the second section.

In an embodiment, a width in the widthwise direction of the connection portion of each of the plurality of ground terminals and a width in the widthwise direction of the connection portion of each of the plurality of power terminals are larger than the width in the widthwise direction of the first contact portion respectively thereof.

In an embodiment, the width in the widthwise direction of the second contact portion of each of the plurality of ground terminals is approximately 3.5 times a width in the widthwise direction of the second contact portion of each of the plurality of signal terminals.

In an embodiment, the width in the widthwise direction of the second contact portion of each of the plurality of power terminals is approximately 3.5 times a width in the widthwise direction of the second contact portion of each of the plurality of signal terminals.

In accordance with another aspect of the present invention, an electrical connector is provided. The electrical connector includes a housing, an insulator and a plurality of terminals. The housing has a front end and a rear end, wherein a direction parallel to a direction from the front end to the rear end is a lengthwise direction of the housing, and a direction perpendicular to the lengthwise direction is a widthwise direction of the housing. The insulator is accommodated in the housing and includes a tongue portion disposed at the front end and a base disposed at the rear end. The plurality of terminals are accommodated in the housing and include a plurality of ground terminals, a plurality of power terminals and a plurality of signal terminals, wherein each of the plurality of terminals has a first contact portion, a second contact portion and a connection portion connecting the first contact portion with the second contact portion. The first contact portions of the plurality of terminals are disposed on surfaces of the tongue portion and arranged in the widthwise direction, and the second contact portions of the plurality of terminals are extended out from the base. A width in the widthwise direction of the second contact portion of each of the plurality of ground terminals and a width in the widthwise direction of the second contact portion of each of the plurality of power terminals are larger than a width in the widthwise direction of the first contact portion respectively thereof. At least two of the second contact portions of the plurality of ground terminals and the plurality of power terminals are arranged in the lengthwise direction.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1A:
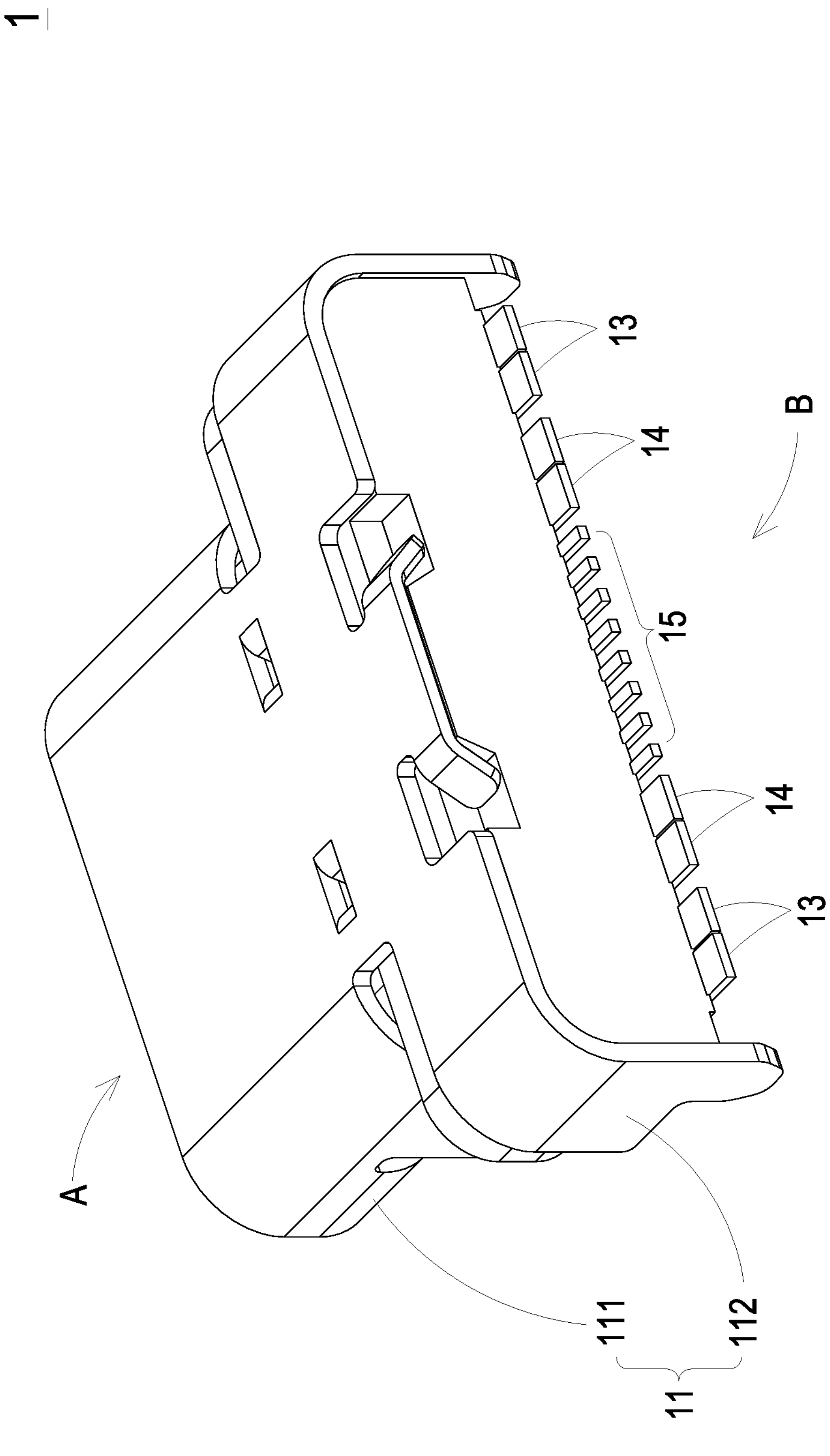
FIG. 1A is a schematic view showing an electrical connector according to a first embodiment of the present disclosure.
Figure 1B:
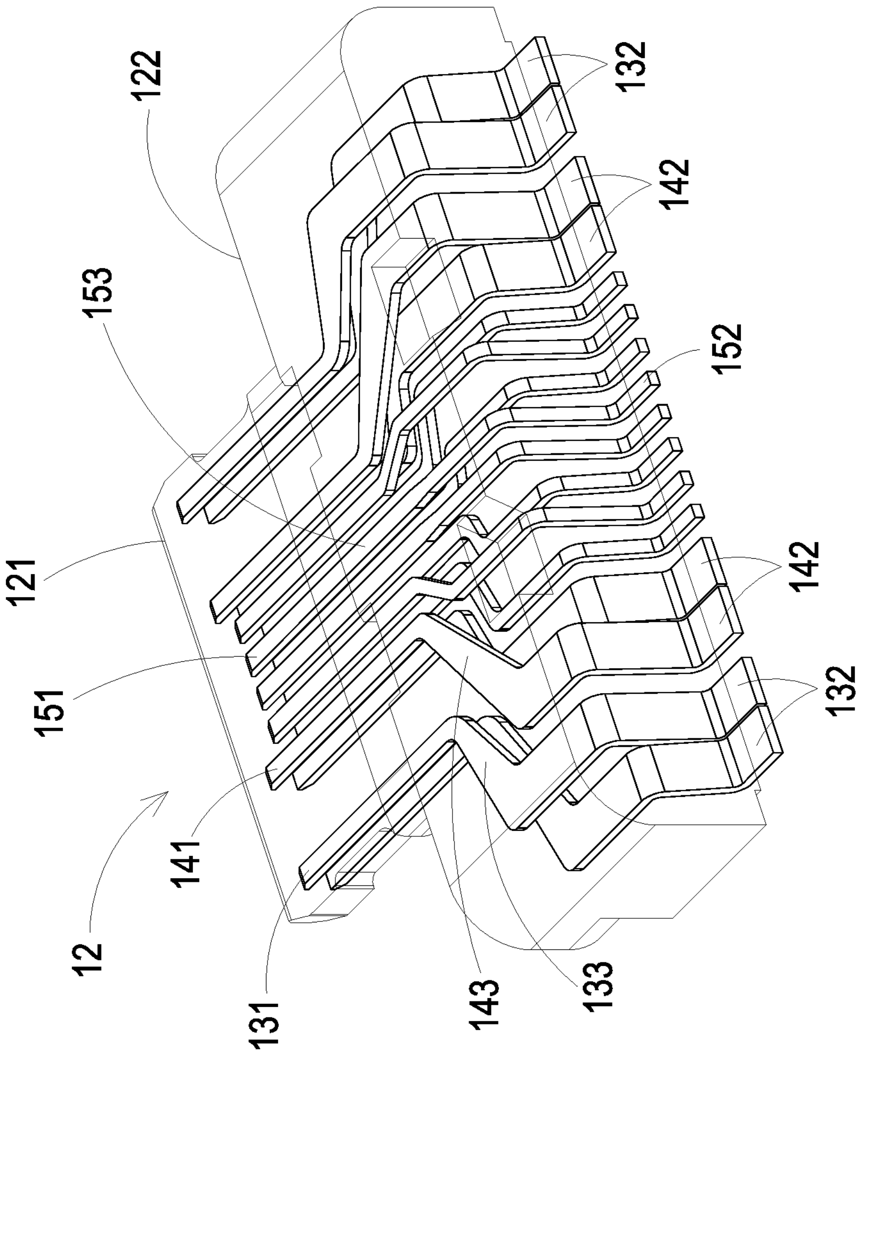
FIG. 1B is a perspective view of an insulator and a plurality of terminals in the electrical connector according to the first embodiment of the present disclosure.
Figure 1C:
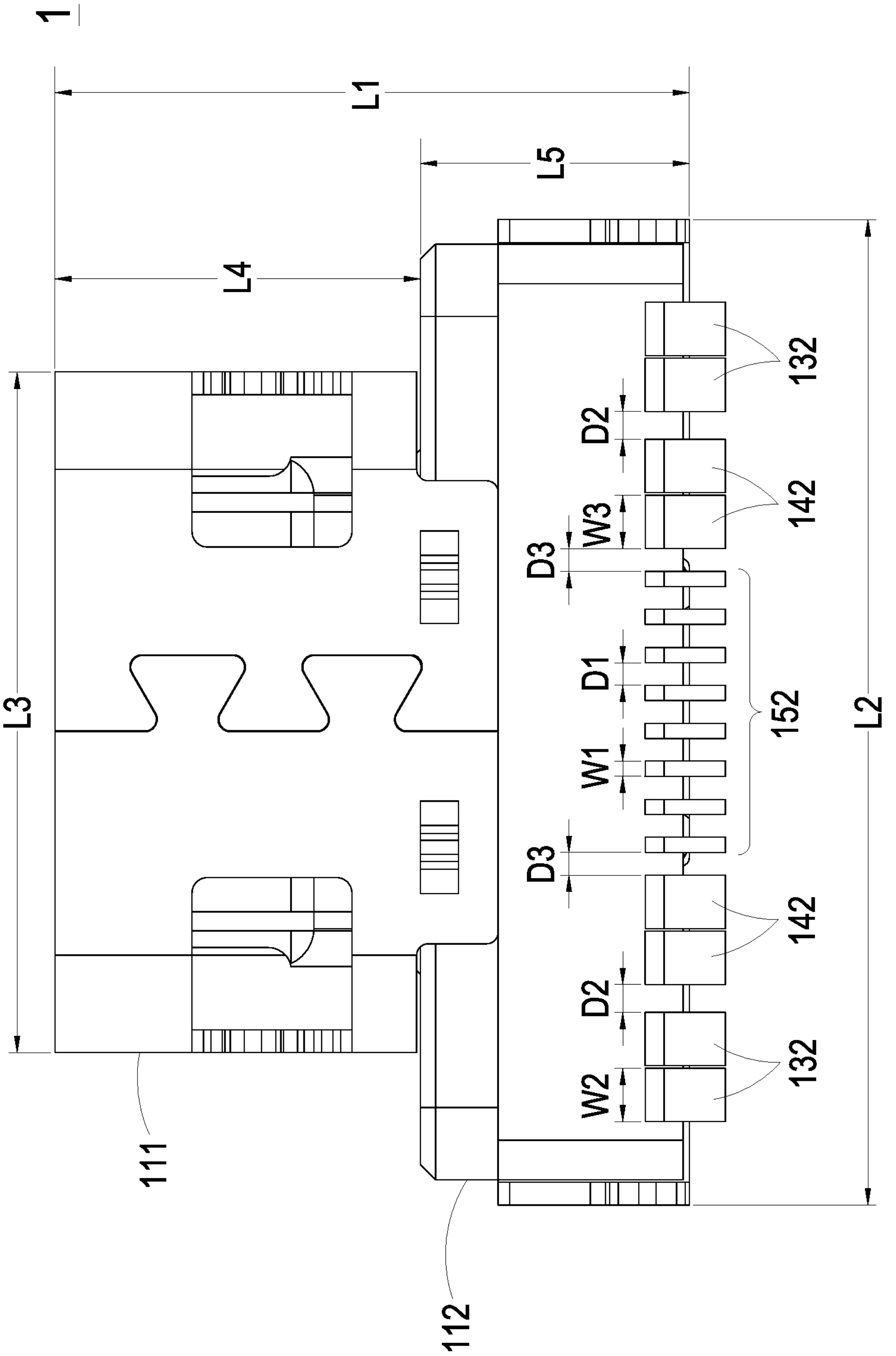
FIG. 1C is a back view of the electrical connector in FIG. 1A.

Please refer to FIG. 1A to FIG. 1C. FIG. 1A is a schematic view showing an electrical connector according to a first embodiment of the present disclosure, FIG. 1B is a perspective view of an insulator and a plurality of terminals in the electrical connector according to the first embodiment of the present disclosure, and FIG. 1C is a back view of the electrical connector in FIG. 1A. An electrical connector 1 includes a housing 11, an insulator 12 and a plurality of terminals, wherein the housing 11 is used to accommodate the insulator 12 and the plurality of terminals. The insulator 12 includes a tongue portion 121 and a base 122, and the plurality of terminals includes a plurality of ground terminals 13, a plurality of power terminals 14 and a plurality of signal terminals 15. For example, the plurality of terminals may include four ground terminals 13, four power terminals 14 and eight signal terminals 15, but not limited thereto. Each of the plurality of ground terminals 13 includes a first contact portion 131, a second contact portion 132 and a connection portion 133 for connecting the first contact portion 131 with the second contact portion 132. Each of the plurality of power terminals 14 includes a first contact portion 141, a second contact portion 142 and a connection portion 143 for connecting the first contact portion 141 with the second contact portion 142. Each of the plurality of signal terminals 15 includes a first contact portion 151, a second contact portion 152 and a connection portion 153 for connecting the first contact portion 151 with the second contact portion 152.

The housing 11 has a front end A and a rear end B. The front end A has a sleeve-like structure for receiving a corresponding electrical connector, and the tongue portion 121 is disposed therein. The rear end B is used to electrically connect with an electronic device (not shown, such as a mobile phone, a tablet or the like). The first contact portions 131, 141, 151 of the plurality of terminals are disposed on two opposite surfaces of the tongue portion 121 for electrically connecting with terminals of the received corresponding electrical connector. The second contact portions 132, 142, 152 of the plurality of terminals are extended out from the base 122 so as to electrically connect with a circuit board (not shown) disposed in the electronic device. That is, the front end A is a plugging end of the electrical connector 1 and the rear end B is a circuit board connecting end of the electrical connector 1.

In order to describe more clearly, a direction parallel to a direction from the front end A to the rear end B is defined as a lengthwise direction of the electrical connector 1, and a direction perpendicular to the lengthwise direction is defined as a widthwise direction of the electrical connector 1. Further, a dimension variation in the lengthwise direction is defined as a length variation of the electrical connector 1, and a dimension variation in the widthwise direction is defined as a width variation of the electrical connector 1.

The tongue portion 121 is a plate structure, and the plate structure is disposed in the housing 11 in a situation that surfaces thereof are parallel to the widthwise direction of the electrical connector 1. The first contact portions 131, 141, 151 of the plurality of terminals are arranged in the widthwise direction on the upper and the lower surfaces of the plate structure, and thus, the first contact portions 131, 141, 151 are also positioned at the front end A. The first contact portions are disposed on the upper and the lower surfaces with an identical arrangement, wherein the first contact portions 151 of the signal terminals 15 are located at the center, the first contact portions 141 of the power terminals 14 are respectively disposed adjacent to two sides of the first contact portions 151, and the first contact portions 131 of the ground terminals 13 are respectively disposed adjacent to the respective other sides of the first contact portions 141. In other words, the electrical connector 1 of the present disclosure is an electrical connector capable of receiving a corresponding electrical connector in dual ways with no directional limitation, such as the USB Type-C connector.

For achieving an increment of the rated current of the electrical connector 1, dimensions and structures of the ground terminals 13 and the power terminals 14 are varied in the present disclosure. As shown in FIG. 1B and FIG. 1C, the widths of the first contact portions 131, 141, 151 of the ground terminals 13, the power terminals 14 and the signal terminals 15 which are located at the surfaces of the tongue portion 121 are substantially the same, and the widths of the second contact portions of different kinds of terminals at the rear end B are different. A width W1 of each of the second contact portions 152 of the signal terminals 15 is maintained to be similar to the width of the respective first contact portion 151 thereof. On the other hands, a width W2 of each of the second contact portions 132 of the ground terminals 13 is larger than the width of the respective first contact portion 131 thereof, and also, a width W3 of each of the second contact portions 142 of the power terminals 14 is larger than the width of the respective first contact portion 141 thereof. Accordingly, in this embodiment, the purpose of increasing the rated current is achieved by increasing the widths of the second contact portions 132, 142 respectively of the ground terminals 13 and the power terminals 14 in the widthwise direction.

The variation of the widths of the ground terminals 13 and the power terminals 14 is the first contact portions 131, 141 are maintained unchanged, e.g., to be the same with the width of the terminal in a general electrical connector, and then, the widths start to change from the connection portions 133, 143. For example, as shown in FIG. 1B, the widths of the ground terminals 13 and the power terminals 14 start to increase from connecting interfaces between the connection portions 133, 143 and the first contact portions 131, 142, then gradually increase to a desired width, and remain the desired width and elongate to the second contact portions 132, 142, but not limited thereto. Notably, the widths W2 and W3 respectively of the second contact portions 132, 142 can be decided depending on practical demands and can be identical to or different from each other without limitation.

When the widths of the ground terminals 13 and the power terminals 14 are increased, it is advantageous of carrying a high level of current. In particular, because the widths are increased from the connection portions 133, 143 and then elongate to the second contact portions 132, 142, other than carrying a high current, the widened terminals are also benefit of dissipating heats and reducing temperature thereof. Consequently, it can effectively meet the requirement of rapid charging for the electrical connector.

For accommodating the widened ground terminals 13 and the widened power terminals 14, especially the widened second contact portions 132, 142, the dimension and the shape of the housing 11 are correspondingly varied. In the embodiment shown in FIG. 1A to FIG. 1C, the housing 11 is divided into a first section 111 and a second section 112 in the lengthwise direction. The first section 111 is located at the front end A of the electrical connector 1, the second section 112 is located at the rear end B of the electrical connector 1, and a width L2 of the second section 112 in the widthwise direction is larger than a width L3 of the first section 111 in the widthwise direction. That is, a length L1 of the electrical connector 1 in the lengthwise direction and a width L3 of the first section 111 in the widthwise direction remain the same, e.g., with the length and the width of the general electrical connector respectively, and only the width L2 of the second section 112 in the widthwise direction is increased to be wider than the width of the general electrical connector. Compared with the situation that the widths of the second contact portions are not increased, in this embodiment, there are eight terminals (four ground terminals 13 and four power terminals 14) with the widened second contact portions, so under the premise that terminals should not interfere with each other, the second contact portions 132, 142, 152 need more spaces for being arranged in one row. Accordingly, the width L2 of the second section 112 of the housing 11 is implemented to be larger than the width L3 of the first section 111, so as to provide a sufficient space to accommodate the second contact portions 132, 142, 152 of all terminals. In other words, compared with the general electrical connector without the widened terminal, in this embodiment, a structural difference is formed between the second section 112 at the rear end B and the first section 111 at the front end A, and the appearance of the housing becomes similar to a T shape.

The width L2 of the second section 112 is decided by the widths of the second contact portions 132, 142 of the ground terminals 13 and the power terminals 14, and also the intervals among all the second contact portions. More specifically, the width L2 of the second section 112 of the housing 11 in the widthwise direction is collectively decided by the widths W2 of the second contact portions 132 of the ground terminals 13, the widths W3 of the second contact portions 142 of the power terminals 14, the widths W1 of the second contact portions 152 of the signal terminals 15, intervals D2 between each of the second contact portions 132 and an adjacent second contact portion 142, intervals D3 between each of the second contact portions 142 and an adjacent second contact portions 152, and intervals D1 between two adjacent second contact portions 152. In other words, when the width of each of the second contact portions and/or the intervals between two adjacent second contact portions are changed, the width L2 of the second section 112 is also changed accordingly.

Moreover, a length L4 of the first section 111 and a length L5 of the second section 112 in the lengthwise direction are mainly decided by the positions of the connection portions 133, 143 of the ground terminals 13 and the power terminals 14 where start to increase the widths thereof. Therefore, the respective lengths of these two sections can be varied depending on the practical demands without limitation, only that a sufficient space is provided for accommodating the widened portions of the terminals. Furthermore, the intervals D1, D2, D3 also can be varied as needed, e.g., D1, D2, D3 can be substantially identical, or D2 and D3 can be implemented to be larger than D3 and/or D2 can be different from D3. It only needs to ensure that the terminals do not interfere with each other and the arrangement of the terminals can be achieved in the manufacture process.

Consequently, through the gradually widened widths of the ground terminals 13 and the power terminals 14 from the connection portions respectively thereof, the electrical connector 1 can achieve the efficiency of carrying a high level of current, and the contact areas of the ground terminals 13 and the power terminals 14 (namely, the areas of the second contact portions 132, 142) with the circuit board also can be increased, so as to further improve heat dissipation, reduce temperature rising and increase the rated current. Moreover, since the electrical connector 1 is the female port which is disposed in the electronic device (such as the mobile phone, the tablet or the like) for receiving the corresponding electrical connector, the housing 11 which includes the second section 112 with the widened width in the widthwise direction can be disposed therein through an inner space planning of the electronic device without difficulty. In addition, the width of the first contact portion of each of the terminals is maintained unchanged, namely, the plugging structure at the front end A still conforms to the general electrical connector, so the plugging and the electrical connection with the corresponding electrical connector are not influenced.

Figure 2A:
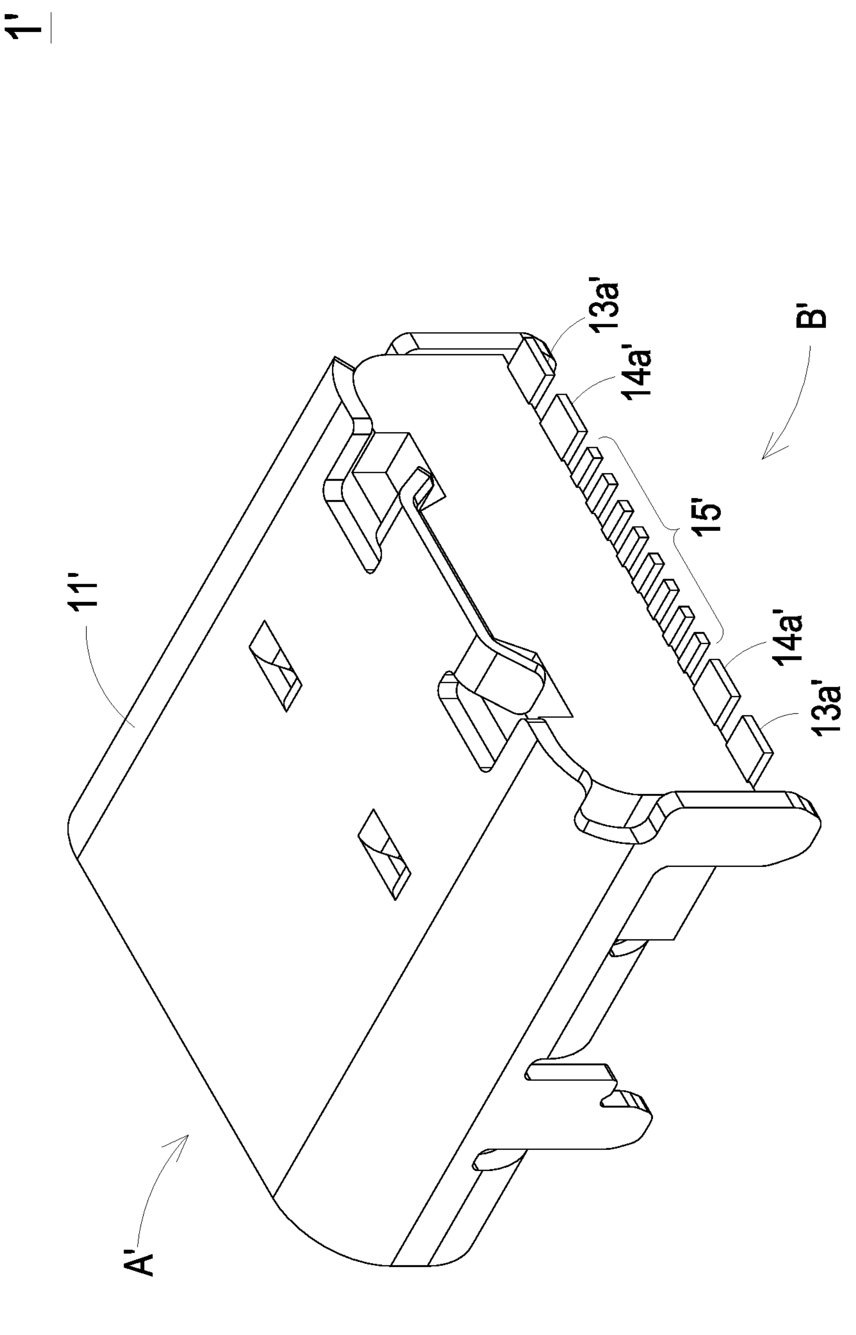
FIG. 2A is a schematic view showing an electrical connector according to a second embodiment of the present disclosure.
Figure 2B:
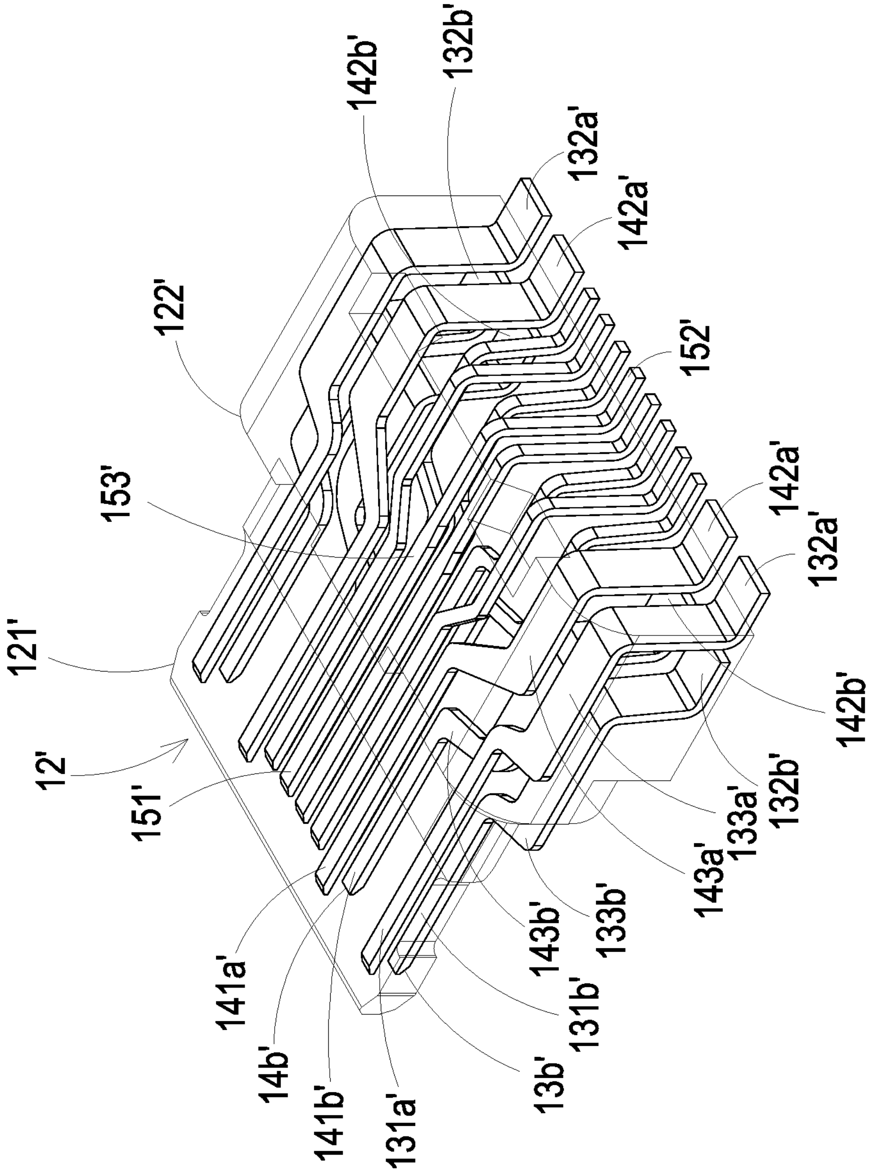
FIG. 2B is a perspective view of an insulator and a plurality of terminals in the electrical connector according to the second embodiment of the present disclosure.
Figure 2C:
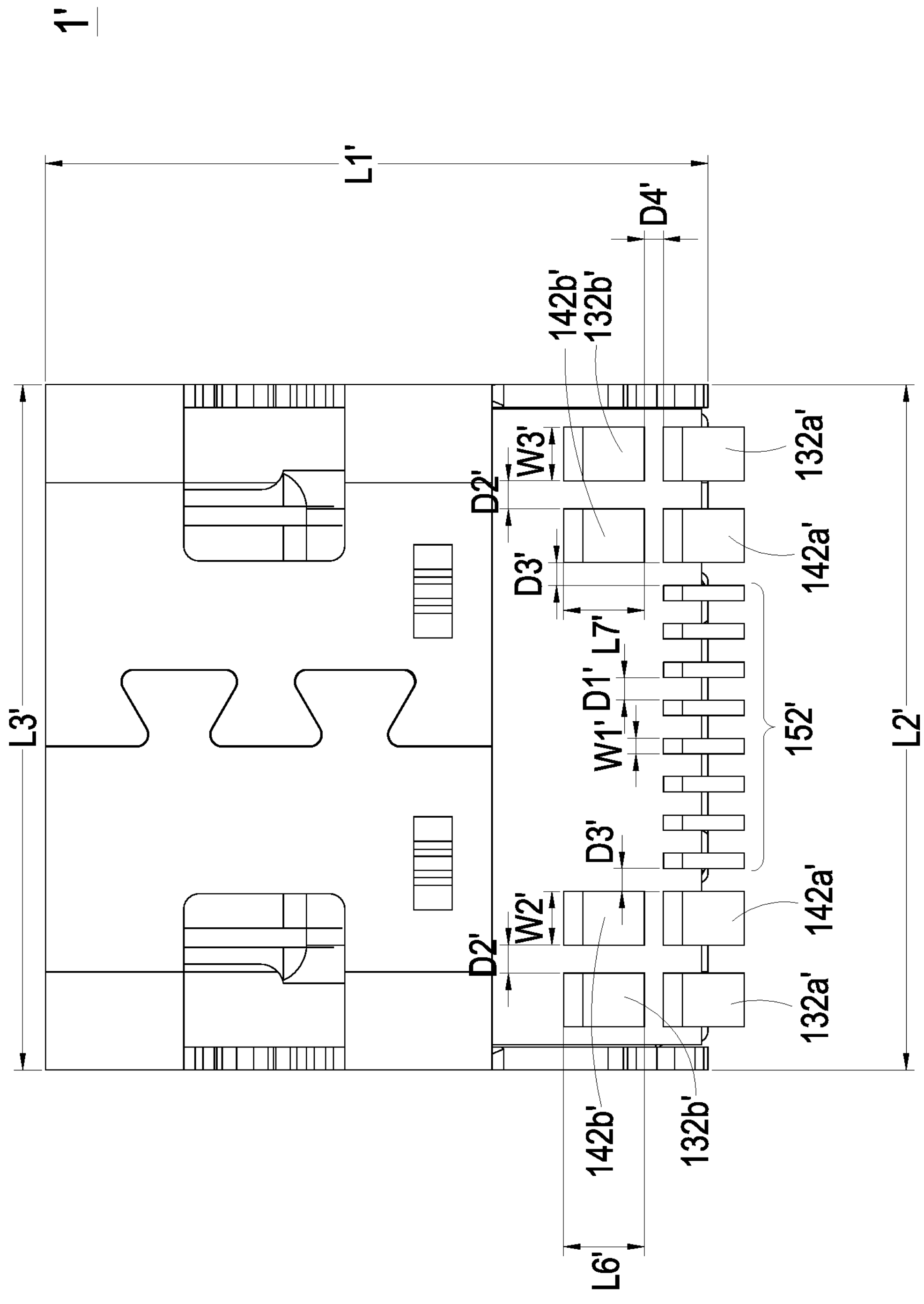
FIG. 2C is a back view of the electrical connector in FIG. 2A.

Please refer to FIG. 2A to FIG. 2C. FIG. 2A is a schematic view showing an electrical connector according to a second embodiment of the present disclosure, FIG. 2B is a perspective view of an insulator and a plurality of terminals in the electrical connector according to the second embodiment of the present disclosure, and FIG. 2C is a back view of the electrical connector in FIG. 2A. An electrical connector 1' includes a housing 11', an insulator 12' and a plurality of terminals, wherein the housing 11' is used to accommodate the insulator 12' and the plurality of terminals. The insulator 12' includes a tongue portion 121' and a base 122', and the plurality of terminals includes a plurality of ground terminals **13*a*', 13*b*', a plurality of power terminals 14*a*', 14*b*' and a plurality of signal terminals 15'. Each of the plurality of ground terminals 13*a*', 13*b*' includes a first contact portion 131*a*', 131*b*', a second contact portion 132*a*', 132*b*' and a connection portion 133*a*', 133*b*' for connecting the first contact portion 131*a*', 131*b*' with the second contact portion 132*a*', 132*b*'. Each of the plurality of power terminals 14*a*', 14*b*' includes a first contact portion 141*a*', 141*b*', a second contact portion 142***a*', 142*b*' and a connection portion 143*a*', 143*b*' for connecting the first contact portion 141*a*', 141*b*' with the second contact portion 142*a*', 142*b*'. Each of the plurality of signal terminals 15' includes a first contact portion 151', a second contact portion 152' and a connection portion 153' for connecting the first contact portion 151' with the second contact portion 152'.

The housing 11' has a front end A' and a rear end B'. The front end A' is used to receive a corresponding electrical connector, and the tongue portion 121' is disposed therein. The rear end B' is used to electrically connect with an electronic device (not shown, such as a mobile phone, a tablet or the like). The first contact portions of the plurality of terminals are disposed on surfaces of the tongue portion 121' for electrically connecting with terminals of the received corresponding electrical connector. The second contact portions of the plurality of terminals are extended out from the base 122' so as to electrically connect with a circuit board (not shown) disposed in the electronic device. That is, the front end A' is a plugging end of the electrical connector 1' and the rear end B' is a circuit board connecting end of the electrical connector 1'.

In order to describe more clearly, a direction parallel to a direction from the front end A' to the rear end B' is defined as a lengthwise direction of the electrical connector 1', and a direction perpendicular to the lengthwise direction is defined as a widthwise direction of the electrical connector 1'. Further, a dimension variation in the lengthwise direction is defined as a length variation of the electrical connector 1', and a dimension variation in the widthwise direction is defined as a width variation of the electrical connector 1'.

In this embodiment, a width W1' of each of the second contact portions 152' of the signal terminals 15' is maintained to have a similar width to the respective first contact portion 151' thereof in the widthwise direction. On the other hands, for increasing the rated current, the widths of the ground terminals 13*a*', 13*b*' and the power terminals 14*a*', 14*b*' start to increase from the connection portions 133*a*', 133*b*', 143*a*', 143*b*', so that a width W2' of each of the second contact portions 132*a*', 132*b*' and a width W3' of each of the second contact portions 142*a*', 142*b*' are larger than the widths of the respective first contact portions thereof. Other structural details are identical to the embodiment shown in FIG. 1A to 1C and are not redundantly described hereinafter.

In this embodiment, for accommodating the widened ground terminals 13*a*', 13*b*' and the widened power terminals 14*a*', 14*b*', especially the second contact portions 132*a*', 132*b*', 142*a*', 142*b*', the dimension and the shape of the housing 11' are correspondingly varied. Different from the embodiment shown in FIG. 1A to FIG. 1C, the variation of the housing 11' is in the lengthwise direction. As shown in FIG. 2A to FIG. 2C, at the rear end B', the ones which are arranged in the widthwise direction with the second portions 152' of the signal terminals 15' are the second contact portions 132*a*' of the ground terminals 13*a*' and the second contact portions 142*a*' of the power terminals 14*a*', and the second contact portions 132*b*' of the ground terminals 13*b*' and the second contact portions 142*b*' of the power terminals 14*b*' are arranged in the widthwise direction in another row, such as a row closer to the front end A'. That is, the second contact portions 132*a*', 132*b*' of the ground terminals 13*a*', 13*b*' are arranged in the lengthwise direction, and the second contact portions 142*a*', 142*b*' of the power terminals 14*a*', 14*b*' are also arranged in the lengthwise direction. Accordingly, a length L1' of the electrical connector 1' is increased, e.g., to be larger than the length of the general electrical connector in the lengthwise direction and also larger than the length L1 of the embodiment shown in FIG. 1A to FIG. 1C. Further, a width L2' of the rear end B' of the housing 11' is maintained to be substantially the same with a width L3' of the front end A'.

The length L1' of the electrical connector 1' is decided by a length L6' of each of the second contact portions 132*b*' of the ground terminals 13*b*' in the lengthwise direction, a length L7' of each of the second contact portions 142*b*' of the power terminals 14*b*', and intervals D4' between the second contact portions 132*a*' and 132*b*' and between the second contact portions 142*a*' and 142*b*'. Moreover, because the second contact portions 132*b*' and 142*b*' are arranged in another row, even the widths of the second contact portions 132*a*' and 142*a*' are widened, the width L2' of the rear end B' of the housing 11' in the widthwise direction still can be maintained to be substantially the same with the width L3' of the front end A', namely, substantially the same with the width of the general electrical connector in the widthwise direction.

Furthermore, the widths W1', W2' and W3' of the second contact portions of the terminals, the intervals D1', D2', D3' and D4', the length L6' of each of the second contact portions 132*b*' of the ground terminals 13*b*', and the length L7' of each of the second contact portions 142*b*' of the power terminals 14*b*' all can be varied depending on the practical demands. It only needs to ensure that the terminals do not interfere with each other and the arrangement of the terminals can be achieved in the manufacture process.

Consequently, through the gradually widened widths of the ground terminals 13*a*', 13*b*' and the power terminals 14*a*', 14*b*' from the connection portions 133*a*', 133*b*', 143*a*', 143*b*' respectively thereof, the electrical connector 1' can achieve the efficiency of carrying a high level of current, and the contact areas of the ground terminals 13*a*', 13*b*' and the power terminals 14*a*', 14*b*' (namely, the areas of the second contact portions 132*a*', 132*b*', 142*a*', 142*b*') with the circuit board in the electronic (such as the mobile phone, the tablet or the like) device also can be increased, so as to further improve heat dissipation, reduce temperature rising and increase the rated current. Moreover, since the electrical connector 1' is the female port which is disposed in the electronic device for receiving the corresponding electrical connector, the housing 11' which has the elongated length in the lengthwise direction as compared with the general electrical connector can be disposed therein through an inner space planning of the electronic device without difficulty. In addition, the width of the first contact portion of each of the terminals are maintained unchanged, namely, the plugging structure at the front end A' still conforms to the general electrical connector, so the plugging and the electrical connection with the corresponding electrical connector are not influenced.

More specifically, the two embodiments of the present disclosure provide two kinds of arrangements of the second contact portions in the electrical connector and two kinds of structural variations of the housing of the electrical connector, so the connection portions and the second contact portions of the ground terminals and the power terminals which are widened for increasing the rated current can be accommodated in the electrical connector appropriately. Compared with the general electrical connector, in the present disclosure, through cooperation between the arrangement of the widened second contact portions and the dimension and the shape of the housing, the accommodation requirement therefor can be achieved selectively by not changing the width of the housing in the widthwise direction or not changing the length of the housing in the lengthwise direction. In addition, it also can be implemented to increase both the width and the length of the housing compared with the general electrical connector, so as to conform to the accommodation requirement resulting from other width variations of the ground terminals and/or the power terminals, without limitation.

No matter adopting which kind of arrangement of the second contact portions and which kind of structural variation of the housing, based on the experimental results, it is known that the increments of the widths of the second contact portions and the connection portions of the ground terminals and the power terminals do help to increase the rated current. For example, in one embodiment, as the width W1/W1' is 0.2 mm and the widths W2/W2' and W3/W3' are 0.7 mm, namely, the widths W2/W2' and W3/W3' are respectively about 3.5 times the width W1/W1', the rated current can reach over 7 A as measured in a basis of 30 degree temperature rising. Therefore, the increments of the widths of the ground terminals and the power terminals in the present disclosure indeed increase the rated current and also help in heat dissipation and temperature reduction. In addition, the proportion of the widths W2/W2' and W3/W3' and the width W1/W1' can be varied depending on the practical demands, e.g., it can be ranged between about 3 to 5 times, without limitation.

In conclusion, through widening the widths of the ground terminals and the power terminals from the connection portions to the second contact portions thereof, the electrical connector of the present disclosure can achieve the purpose of carrying a high level of current and increasing the rated current and also the efficiencies of improving heat dissipation and reducing temperature rising. Moreover, corresponding to the different arrangements of the widened ground terminals and the widened power terminals, the dimension and the shape of the electrical connector of the present disclosure at the circuit board connecting end are also selectively varied for matching to the width increment in the widthwise direction and/or the length increment in the lengthwise direction, thereby providing a sufficient accommodation space to ensure the terminals do not interfere with each other, and at the same time, keeping the plugging end still conforming to the general electrical connector.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electrical connector, comprising:

a housing having a front end and a rear end, wherein a direction parallel to a direction from the front end to the rear end is a lengthwise direction of the housing, and a direction perpendicular to the lengthwise direction is a widthwise direction of the housing;

an insulator accommodated in the housing and comprising a tongue portion disposed at the front end and a base disposed at the rear end; and a plurality of terminals accommodated in the housing and comprising a plurality of ground terminals, a plurality of power terminals and a plurality of signal terminals, wherein each of the plurality of terminals has a first contact portion, a second contact portion and a connection portion connecting the first contact portion with the second contact portion, wherein the first contact portions of the plurality of terminals are disposed on surfaces of the tongue portion and arranged in the widthwise direction, and the second contact portions of the plurality of terminals are extended out from the base;

wherein a width in the widthwise direction of the second contact portion of each of the plurality of ground terminals and a width in the widthwise direction of the second contact portion of each of the plurality of power terminals are larger than a width in the widthwise direction of the first contact portion respectively thereof; and wherein the housing in the lengthwise direction is divided into a first section located at the front end and a second section located at the rear end, and a width of the second section in the widthwise direction is larger than a width of the first section in the widthwise direction.

2. The electrical connector as claimed in claim 1, wherein the second contact portions of the plurality of ground terminals and the plurality of power terminals are arranged in the widthwise direction at the second section.

3. The electrical connector as claimed in claim 1, wherein a width in the widthwise direction of the connection portion of each of the plurality of ground terminals and a width in the widthwise direction of the connection portion of each of the plurality of power terminals are larger than the width in the widthwise direction of the first contact portion respectively thereof.

4. The electrical connector as claimed in claim 1, wherein the width in the widthwise direction of the second contact portion of each of the plurality of ground terminals is approximately 3.5 times a width in the widthwise direction of the second contact portion of each of the plurality of signal terminals.

5. The electrical connector as claimed in claim 1, wherein the width in the widthwise direction of the second contact portion of each of the plurality of power terminals is approximately 3.5 times a width in the widthwise direction of the second contact portion of each of the plurality of signal terminals.

6. An electrical connector, comprising:

a housing having a front end and a rear end, wherein a direction parallel to a direction from the front end to the rear end is a lengthwise direction of the housing, and a direction perpendicular to the lengthwise direction is a widthwise direction of the housing;

an insulator accommodated in the housing and comprising a tongue portion disposed at the front end and a base disposed at the rear end; and a plurality of terminals accommodated in the housing and comprising a plurality of ground terminals, a plurality of power terminals and a plurality of signal terminals, wherein each of the plurality of terminals has a first contact portion, a second contact portion and a connection portion connecting the first contact portion with the second contact portion, wherein the first contact portions of the plurality of terminals are disposed on surfaces of the tongue portion and arranged in the widthwise direction, and the second contact portions of the plurality of terminals are extended out from the base;

wherein a width in the widthwise direction of the second contact portion of each of the plurality of ground terminals and a width in the widthwise direction of the second contact portion of each of the plurality of power terminals are larger than a width in the widthwise direction of the first contact portion respectively thereof; and wherein at least two of the second contact portions of the plurality of ground terminals and the plurality of power terminals are arranged in the lengthwise direction.

7. The electrical connector as claimed in claim 6, wherein a width in the widthwise direction of the connection portion of each of the plurality of ground terminals and a width in the widthwise direction of the connection portion of each of the plurality of power terminals are larger than the width in the widthwise direction of the first contact portion respectively thereof.

8. The electrical connector as claimed in claim 6, wherein the width in the widthwise direction of the second contact portion of each of the plurality of ground terminals is approximately 3.5 times a width in the widthwise direction of the second contact portion of each of the plurality of signal terminals.

9. The electrical connector as claimed in claim 6, wherein the width in the widthwise direction of the second contact portion of each of the plurality of power terminals is approximately 3.5 times a width in the widthwise direction of the second contact portion of each of the plurality of signal terminals.

* * * * *